(12) United States Patent
Wong (10) Patent No.: US 12,380,750 B2
(45) Date of Patent: Aug. 5, 2025

(54) VIDEO-BASED DOOR OPERATION USING OBJECT TRACKING OF MOBILITY ASSISTANCE DEVICES

(71) Applicant: Alarm.com Incorporated, Tysons, VA (US)

(72) Inventor: Kelly Kai Ming Wong, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 248 days.

(21) Appl. No.: 17/833,021

(22) Filed: Jun. 6, 2022

(65) Prior Publication Data

US 2023/0009940 A1  Jan. 12, 2023

Related U.S. Application Data

(60) Provisional application No. 63/218,600, filed on Jul. 6, 2021.

(51) Int. Cl.
*G07C 9/00* (2020.01)
*G06V 20/52* (2022.01)
*G07C 9/38* (2020.01)

(52) U.S. Cl.
CPC ......... *G07C 9/00563* (2013.01); *G06V 20/52* (2022.01); *G07C 9/00571* (2013.01); *G07C 9/00658* (2013.01); *G07C 9/00896* (2013.01); *G07C 9/38* (2020.01)

(58) Field of Classification Search
CPC ....... G06V 20/52; G07C 9/00; G07C 2009/00
See application file for complete search history.

(56) References Cited

U.S. PATENT DOCUMENTS

| 7,079,669 B2* | 7/2006 | Hashimoto | G06V 40/161 |
| | | | 382/106 |
| 9,605,465 B2 | 3/2017 | Wojdyla et al. | |
| 9,605,469 B2 | 3/2017 | Henseleit et al. | |
| 9,816,308 B2 | 11/2017 | Myers et al. | |
| 10,370,888 B2 | 8/2019 | Harding et al. | |
| 10,926,756 B2 | 2/2021 | Dastous et al. | |
| 11,072,966 B1* | 7/2021 | Eubanks | G06V 40/10 |
| 2008/0298687 A1* | 12/2008 | Lai | G07C 9/37 |
| | | | 382/218 |

(Continued)

*Primary Examiner* — Mirza F Alam
(74) *Attorney, Agent, or Firm* — Fish & Richardson P.C.

(57) ABSTRACT

Disclosed are methods, systems, and apparatus for video-based door operation using object tracking of mobility assistance devices. A method includes detecting, in one or more images captured by a camera, a mobility assistance device; in response to detecting the mobility assistance device, determining, using the one or more images captured by the camera, a trajectory of the mobility assistance device; determining that the trajectory of the mobility assistance device satisfies a criterion for operating a door; and in response to determining that the trajectory of the mobility assistance device satisfies the criterion for operating the door, transmitting, to a door operator, a command to operate the door. A method includes determining whether the operation of the door satisfies performance criteria using one or more second images; and in response to determining that the operation of the door does not satisfy performance criteria, updating the criterion for operating the door.

20 Claims, 4 Drawing Sheets

(56) References Cited

U.S. PATENT DOCUMENTS

| | | | |
|---|---|---|---|
| 2018/0273345 A1* | 9/2018 | Rao | G09G 5/006 |
| 2020/0087115 A1* | 3/2020 | Dhumal | B66B 13/146 |
| 2021/0375083 A1* | 12/2021 | Vilhelmsen | G07C 9/00944 |

* cited by examiner

VIDEO-BASED DOOR OPERATION USING OBJECT TRACKING OF MOBILITY ASSISTANCE DEVICES

CROSS-REFERENCE TO RELATED APPLICATIONS

This application claims the benefit of the U.S. Provisional Patent Application No. 63/218,600, filed Jul. 6, 2021, which is incorporated herein by reference in its entirety.

TECHNICAL FIELD

This disclosure application relates generally to video cameras.

BACKGROUND

This disclosure application relates generally to video cameras. Cameras and other monitoring devices are often installed at properties such as homes or commercial businesses. Cameras may be configured to detect events and trigger actions in response to the detection of the events.

Mobility assistance devices can include wheelchairs, scooters, crutches, walkers, and canes. Automated door operations can improve ease of access to properties and rooms by people who use mobility assistance devices.

SUMMARY

Systems and methods for video-based door operation using tracking are disclosed. A video camera can obtain visual images of a scene at a property that includes a doorway. The camera can detect, classify, and track objects within the scene. Based on object detection, classification, and tracking, the camera can provide instructions to a motorized door operating system that cause the door to open or shut.

In some examples, the camera can detect a mobility assistance device, determine that the mobility assistance device is approaching a doorway, and transmit a command to a door operator that causes the door to open before the mobility assistance device reaches the doorway. When the camera determines that the mobility assistance device has passed through the doorway, the camera can transmit a command that causes the door to shut.

The disclosed implementations can provide the following advantages. Video-based door operation using object tracking can improve access to properties by people using mobility assistance devices. For example, a person in a wheelchair can approach and pass through a doorway without slowing down. The door can open automatically without relying on a push button system. Thus, people who are unable to reach a push button can enter through the doorway with reduced difficulty.

In some implementations, video-based door operation using object tracking can improve the timeliness of opening and shutting a door. For example, a door that opens too early or shuts too late can waste energy due to climate controlled areas being exposed to the environment. A door that opens too late can cause a person using a mobility assistance device to slow down or stop as the person approaches the doorway. A door that shuts too early can inhibit the person's ability to safely pass through the doorway.

Video-based door operation can be used in various settings, including residential apartment buildings, malls, businesses, universities, and other public buildings where accessibility may be an important part of regulatory requirements and, in some cases, an important part of the building infrastructure, interior/exterior design, or both.

In general, innovative aspects include a method including actions of detecting, in one or more images captured by a camera, a mobility assistance device; in response to detecting the mobility assistance device, determining, using the one or more images captured by the camera, a trajectory of the mobility assistance device; determining that the trajectory of the mobility assistance device satisfies a criterion for operating a door; and in response to determining that the trajectory of the mobility assistance device satisfies the criterion for operating the door, transmitting, to a door operator, a command to operate the door.

Other embodiments of this and other aspects include corresponding systems, apparatus, and computer programs, configured to perform actions of the methods encoded on computer storage devices. A system of one or more computers or other processing devices can be so configured by virtue of software, firmware, hardware, or a combination of them installed on the system that in operation cause the system to perform the actions. One or more computer programs can be so configured by virtue of a non-transitory computer-readable medium storing software having instructions that, when executed by data processing apparatus, cause the apparatus to perform the actions.

These and other embodiments may each optionally include one or more of the following features. In some implementations, the actions include determining whether the operation of the door satisfies performance criteria using one or more second images; and in response to determining that the operation of the door does not satisfy performance criteria, updating the criterion for operating the door.

In some implementations, the one or more second images include images captured by the camera after transmitting the command to operate of the door.

In some implementations, determining whether the operation of the door satisfies performance criteria using the one or more second images includes: determining, using the one or more second images, a change in velocity of the mobility assistance device; determining that the change in velocity of the mobility assistance device does not satisfy a threshold change in velocity; and based on determining that the change in velocity of the mobility assistance device does not satisfy the threshold change in velocity, determining that the operation of the door does not satisfy performance criteria.

In some implementations, determining whether the operation of the door satisfies performance criteria using one or more second images includes: determining, using the one or more second images, a smallest distance between the mobility assistance device and the door; determining that the smallest distance between the mobility assistance device and the door does not satisfy a threshold distance; and based on determining that the smallest distance between the mobility assistance device and the door does not satisfy a threshold distance, determining that the operation of the door does not satisfy performance criteria.

In some implementations, determining whether the operation of the door satisfies performance criteria using one or more second images includes: determining, using the one or more second images, a duration of time that the door is open; determining that amount of time that the door is open does not satisfy a threshold duration of time; and based on determining that the amount of time that the door is open does not satisfy a threshold duration of time, determining that the operation of the door does not satisfy performance criteria.

In some implementations, determining the trajectory of the mobility assistance device includes determining an expected time until arrival of the mobility assistance device within a threshold distance from a doorway of the door.

In some implementations, determining that the trajectory of the mobility assistance device satisfies the criterion for operating the door includes: determining that the expected time until arrival of the mobility assistance device within the threshold distance from the doorway of the door satisfies a threshold expected time.

In some implementations, determining the expected time until arrival of the mobility assistance device within the threshold distance from the doorway of the door includes: determining, using the one or more images, a direction of travel of the mobility assistance device; and determining, using the one or more images, a speed of the mobility assistance device.

In some implementations, determining the trajectory of the mobility assistance device includes determining an expected time until departure of the mobility assistance device from a swing area of the door.

In some implementations, determining that the trajectory of the mobility assistance device satisfies the criterion for operating the door includes: determining that the expected time until departure of the mobility assistance device from the swing area of the door satisfies a threshold expected time.

In some implementations, determining that the trajectory of the mobility assistance device satisfies the criterion for operating the door includes: determining, using the one or more images, that the mobility assistance device is predicted to cross a virtual line crossing; or determining, using the one or more images, that the mobility assistance device is predicted to enter an area of interest.

In some implementations, the actions include storing criteria for a plurality of operations of the door; determining, using the one or more images, a particular operation of the plurality of operations to be performed; and selecting, from the stored criteria, the criterion for performing the particular operation of the door.

In some implementations, the actions include storing, for each of a plurality of characteristics of mobility assistance devices, respective criteria for operating the door; determining, using the one or more images, a characteristic of the mobility assistance device; and selecting, from the stored criteria, the criterion for operating the door using the characteristic of the mobility assistance device.

In some implementations, the actions include storing, for each of multiple sides of the door, respective criteria for operating the door; determining, using the one or more images, a particular side of the door on which the mobility assistance device is detected; and selecting, from the stored criteria, the criterion for operating the door using the particular side of the door on which the mobility assistance device is detected.

In some implementations, the one or more images depict a scene of a property including a doorway.

In some implementations, detecting the mobility assistance device includes detecting the mobility assistance device using an object classifier of the camera.

In some implementations, the command for operating the door includes one of: a command to open the door; a command to maintain the door in an open position; a command to shut the door; or a command to maintain the door in a shut position.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A property, such as a house or a place of business, can be equipped with one or more video recording devices, e.g., video cameras that are each configured to provide information to a monitoring server of the system. The cameras can be located interior to the property and exterior to the property.

Figure 1A:
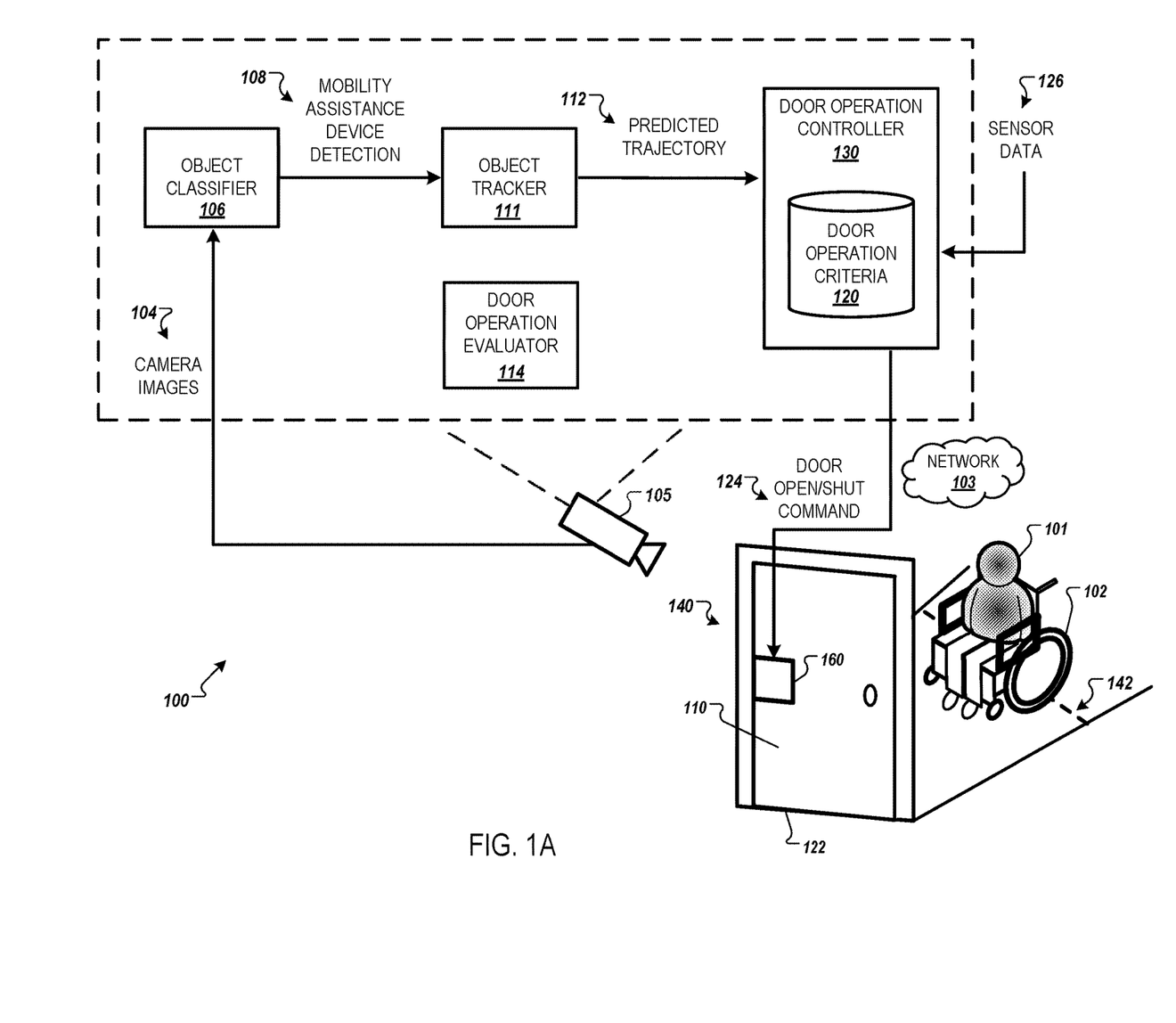
FIG. 1A shows a block diagram of an example system for video-based door operation.

FIG. 1A shows a block diagram of an example system 100 for video-based door operation. The system 100 includes a camera 105. The camera 105 can be installed at a property such as a home, another residence, a place of business, a public space, or another facility. In some examples, the camera 105 can be integrated into a component of a monitoring system, such as a doorbell device. In some examples, the camera 105 can be a standalone device.

The camera 105 is installed near a doorway 140. The camera 105 can be mounted at a position such that the camera 105 has a field of view that includes at least part of the doorway 140. The camera 105 is configured to obtain video image data, still image data, or both, depicting an area of the property that includes the doorway 140. In some examples, camera images 104 captured by the camera 105 can include depictions of both sides of the doorway 140. In some examples, camera images 104 might include only one side of the doorway 140.

In some examples, the door operation controller 130 can send a command to the door operator 160 to operate the door 110. Operation of the door 110 can include, for example, opening the door 110, shutting the door 110, maintaining the door 110 open, maintaining the door 110 shut, or any combination of these. For example, using the camera images 104, the camera 105 can send a command to the door operator 160 to open the door 110 or to shut the door 110. In some examples, in addition to or instead of being operated by the door operator 160, the door 110 can be operated manually. For example, a person can open or shut the door 110 by pushing or pulling on the door 110.

In some examples, in addition to receiving commands from the door operation controller 130, the door operator 160 can be controlled by other means. For example, the system 100 can include a button positioned near the doorway 140. The button can be in communication with the door operator 160, such that the door operator 160 opens the door 110 in response to a user pressing the button.

In some examples, the camera 105 can be positioned above the doorway 140 or next to the doorway 140. In some examples, the camera 105 can be positioned at a location that is inside or outside of the doorway. In some examples, multiple cameras can be installed near the doorway 140 and can have overlapping fields of view that include the doorway 140. The multiple cameras can capture images of the doorway 140 from different perspectives.

The doorway 140 includes a door 110, a doorsill 122, and a door operator 160. The door operator 160 can be a device that controls the functions of the door 110. For example, the door operator 160 can be a motorized door operator that is configured to control operations of the door in order to open the door 110, to maintain the door 110 in an open position, to shut the door 110, to maintain the door 110 in a shut position, or any of these.

In the system 100, the door 110 is a single swinging door that swings in a direction towards the camera 105. In some examples, the door 110 can be configured to swing open in a direction towards the camera 105, in a direction away from the camera 105, or both. In some examples, the door 110 can be a double door. In some examples, the door 110 can be a sliding door, an overhead door, or a revolving door.

The door operator 160 can apply a force to the door 110 in order to open the door and to maintain the door 110 in an open position. In some examples, the door operator 160 can apply a force to the door 110 in order to shut the door 110.

In some examples, the door 110 is configured to shut when the force from the door operator 160 is not applied. For example, when the door operator 160 ceases applying a force on the door 110, the door can shut, e.g., due to spring tension. In some examples, when in a shut position, the door 110 is configured to remain shut unless a force is applied to the door 110, e.g., by the door operator 160 or by a user opening the door 110.

In some implementations, the camera 105 can communicate with the door operator 160 over a network 103. For example, the camera 105 can transmit, over the network, door open/shut commands 124 to the door operator 160 that cause the door operator 160 to open the door 110, to shut the door, to keep the door open, and to keep the door shut.

The network 103 may be any communication infrastructure that supports the electronic exchange of data between the camera 105 and the door operator 160. The network 103 may include a local area network (LAN), a wide area network (WAN), the Internet, or other network topology. The network 103 may be any one or combination of wireless or wired networks and may include any one or more of Ethernet, cellular telephony, Bluetooth, Wi-Fi, Z-Wave, ZigBee, and Bluetooth Low Energy (BLE) technologies. In some implementations, the network 103 may include optical data links. To support communications through the network 103, one or more devices of the monitoring system may include communications modules, such as a modem, transceiver, modulator, or other hardware or software configured to enable the device to communicate electronic data through the network 103.

The camera 105 can include an embedded computer with video analytics software. The video analytics software can use image segmentation or other computer vision technology. In some examples, the camera 105 can include a processor, a chipset, a memory system, or other computing hardware. In some cases, the camera 105 may include application-specific hardware, such as a field-programmable gate array (FPGA), an application-specific integrated circuit (ASIC), or other embedded or dedicated hardware. The camera 105 may include software, which configures the camera 105 to perform the functions described in this disclosure. In some implementations, a user can communicate with the camera 105 through a physical connection (e.g., touch screen, keypad) and/or network connection. In some implementations, the user can communicate with the camera 105 through a software application installed on a computing device, e.g., a mobile device such as a smart phone.

The camera 105 includes an object classifier 106, an object tracker 111, a door operation controller 130, and a door operation evaluator 114. The door operation controller 130 can store door operation criteria 120. The camera 105 can perform video analysis on captured camera images 104, and based on the video analysis, control the door operator 160.

For example, the camera 105 can perform video analysis using an object classifier 106 and an object tracker 111. The door operation controller 130 can compare video analysis results to door operation criteria 120. Based on the comparison, the door operation controller 130 can control the door operator 160. The camera 105 can evaluate operation of the door 110 using the door operation evaluator 114. Door operation evaluation is described in greater detail with reference to FIG. 1B.

Based on video analysis of the images 104, the camera 105 can detect and classify a mobility assistance device. Additionally, based on video analysis of the images 104, the camera 105 can determine additional characteristics of the mobility assistance device, e.g., a size of the mobility assistance device, an orientation of the mobility assistance device, whether the mobility assistance device include wheels, a size of the wheels, or any combination of these.

The object classifier 106 can classify objects in images 104 captured by the camera 105. The object classifier 106 can be, for example, a machine learning model such as a deep learning neural network model. The object classifier 106 can be trained to detect and classify objects in images 104. In some examples, the object classifier 106 can classify objects within the images 104 in real-time or near real-time.

In some examples, the object classifier 106 can be pretrained using a supervised machine learning training method. The object classifier 106 can be trained using labeled images of objects. For example, a training process can include providing the object classifier 106 with images of wheelchairs labeled "wheelchair." The object classifier 106 can be trained to identify objects of interest such as humans. The object classifier 106 can also be trained to perform mobility assistance device detection 108. The object classifier 106 can detect and identify mobility assistance devices such as wheelchair, canes, crutches, walkers, or any combination of these. In some examples, the object classifier 106 can be trained to identify other objects that can hinder a person's ability to manually open the door, e.g., strollers, stretchers, shopping carts, or any of these. The camera 105 can then use the trained object classifier 106 to perform object classification in the images 104 captured by the camera 105.

In some examples, the object classifier 106 can identify a wheelchair 102 in an image based on identifying one or more wheels in the image. For example, the object classifier 106 can be configured to identify a depiction of an object in the image that satisfies criteria for depicting a wheel. The criteria can include, for example, criteria for a shape, size, and appearance of wheelchair wheels.

In some examples, the object classifier 106 can identify a wheelchair 102 in an image based on identifying a face of a person 101 in the image. For example, the object classifier 106 can be configured to identify a depiction of an object in the image that satisfies criteria for depicting a face of a person 101 in a wheelchair 102. The criteria can include, for example, criteria for a shape, size, and appearance of a face.

The criteria can also include criteria for a position of the face in the image in relation to a position of the wheels in the image.

The object tracker 111 can track targets classified by the object classifier 106. For example, based on the mobility assistance device detection 108, the object tracker 111 can perform object tracking of the mobility assistance device, e.g., the wheelchair 102.

The object tracker 111 can track object movement within the field of view of the camera 105. The object tracker 111 can use video tracking to associate targets in consecutive video images, or frames. Specifically, the object tracker 111 can use video tracking to identify a location of the wheelchair 102 in a frame, and to predict a location of the wheelchair 102 in a subsequent frame. In some examples, the object tracker 111 can identify a bounding box around the wheelchair 102 in a frame, and predict a position of the bounding box in a subsequent frame.

The object tracker 111 can determine a predicted trajectory 112 of the wheelchair 102. The predicted trajectory 112 can include, for example, a predicted direction of travel of the wheelchair, a speed of the wheelchair, or any combination of these. In some examples, the predicted trajectory 112 can include a path towards the doorway 140. The predicted trajectory 112 can include an expected time until arrival of the wheelchair 102 at the doorway 140. Arrival of the wheelchair 102 at the doorway 140 can include arrival of the wheelchair 102 within a threshold distance from the doorway 140. The threshold distance from the doorway 140 can be, for example, a particular number of feet or meters from the doorsill 122 of the doorway 140. The expected time until arrival of the wheelchair 102 within a threshold distance from the doorway 140 can be based, for example, on the speed and direction of travel of the wheelchair 102.

The object tracker 111 can output the predicted trajectory 112 to the door operation controller 130. The door operation controller 130 can compare the predicted trajectory 112 of the wheelchair 102 to door operation criteria 120.

Figure 2A:
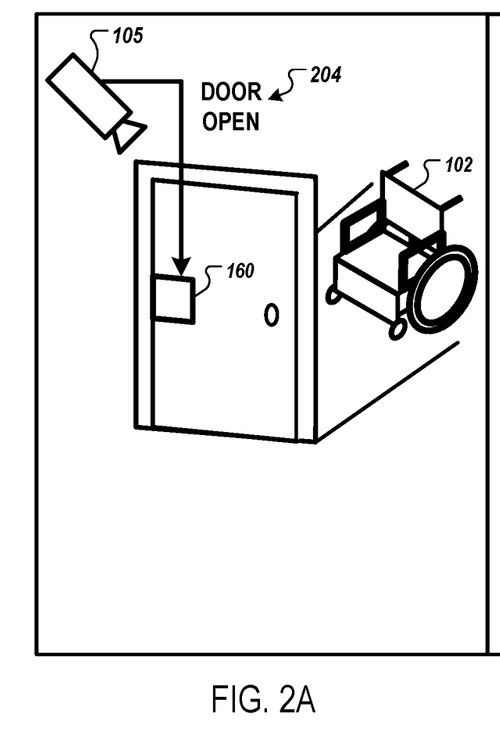
FIGS. 2A to 2C show steps of an example process for video-based door operation using object tracking.

Referring to FIG. 2A, the door operation controller 130 can determine to open the door. The door operation controller 130 can determine to open the door 110, e.g., using the predicted trajectory 112. For example, the door operation controller 130 can determine to open the door 110 based on the wheelchair 102 being predicted to approach the doorway 140.

The door operation controller 130 can determine a time to begin opening the door 110 using the door operation criteria 120. An example door operation criterion 120 can include a time to begin opening the door 110 relative to an expected arrival time of the wheelchair 102 within a threshold distance from the doorway 140. For example, the door operation criteria 120 can specify that the door 110 is to open at a time that is five seconds prior to the expected time of arrival of the wheelchair 102 within the threshold distance from the doorway.

Figure 1B:
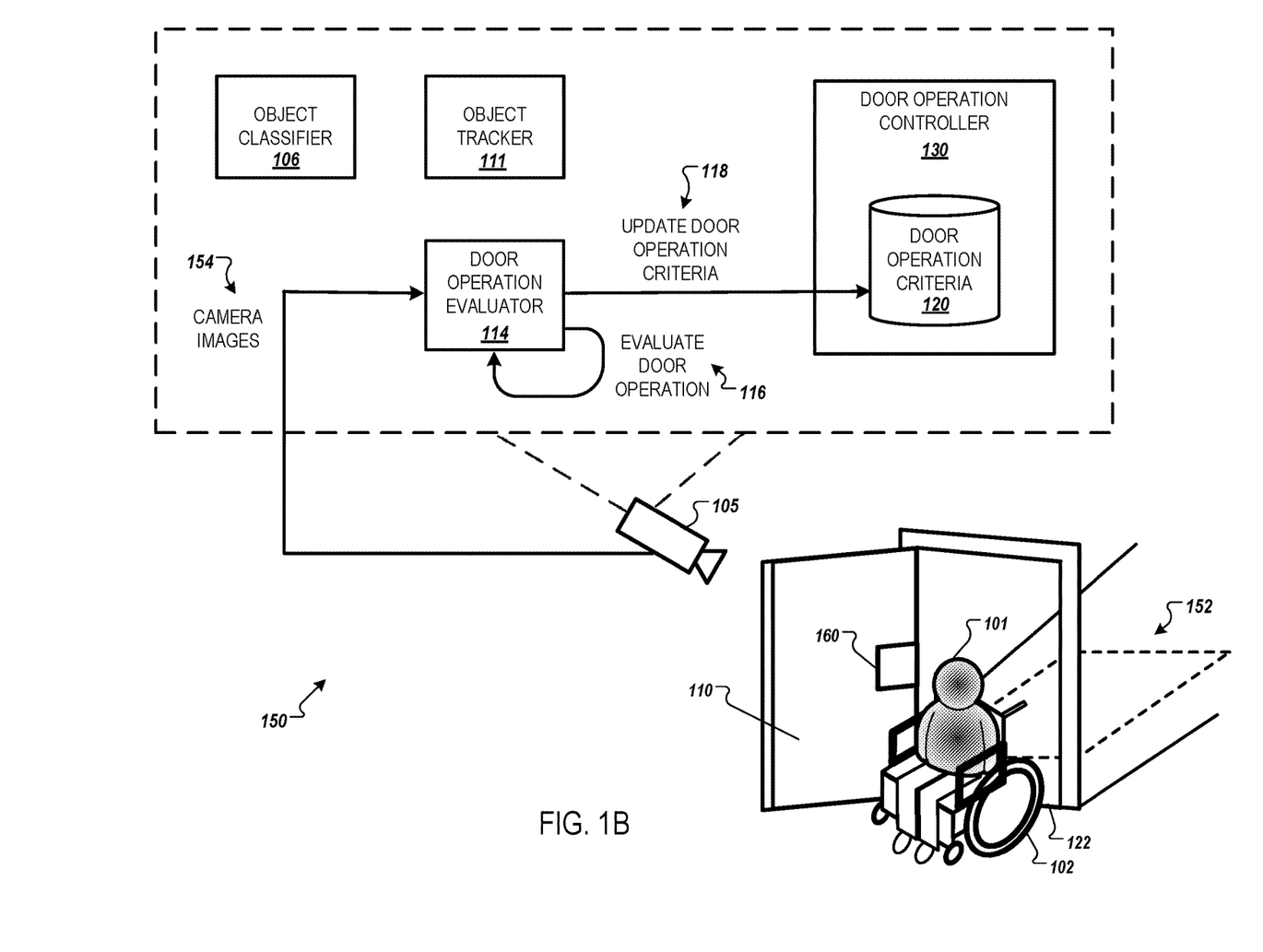
FIG. 1B shows a block diagram of an example system for evaluation of video-based door operation.

An example door operation criterion 120 can include a time to begin opening the door 110 relative to a position of the wheelchair 102. The door operation criterion 120 can specify that the door 110 is to open when the wheelchair 102 enters an area of interest within the field of view of the camera 105. In some examples, the door operation criterion 120 can specify that the door 110 is to open at a time when the wheelchair 102 is predicted to enter the area of interest, based on the predicted trajectory 112. An example area of interest 152 is shown in FIG. 1B. An example door operation criterion 120 can specify that the door 110 is to open when the wheelchair 102 crosses a virtual line crossing 142, or video tripwire, within the field of view of the camera 105. An example door operation criterion 120 can specify that the door 110 is to open when the wheelchair 102 is predicted to cross the virtual line crossing 142, based on the predicted trajectory 112.

In some examples, an area of interest, a virtual line crossing, or both, can be generated using user input. For example, a user can provide input to the camera 105 identifying a location of a virtual line crossing or boundaries of an area of interest. The user input can be provided, e.g., through a user interface that enables a user to draw boundaries on an image captured by the camera 105.

In some examples the door operation controller 130 can store door operation criteria 120 for various circumstances, scenarios, and door operations. The door operation controller 130 can store door operation criteria 120 for various characteristics of the mobility assistance device. The door operation controller 130 can select the appropriate door operation criteria 120 for the scenario depicted in the camera images 104. For example, the door operation criteria 120 can include multiple different areas of interest. The door operation criteria 120 can also include multiple different virtual line crossings. Thus, the door operation criteria 120 can be adjustable, e.g., based on the predicted trajectory 112.

As an example, a characteristic of the mobility assistance device can be a speed of the mobility assistance device. The door operation criteria 120 can include criteria for different speeds of the mobility assistance device. In an example, when the wheelchair 102 is traveling at a slower speed, the door operation controller 130 can select criteria including a virtual line crossing that is closer to the doorway 140. When the wheelchair 102 is traveling at a faster speed, the door operation controller 130 can select criteria including a virtual line crossing that is further from the doorway 140. Similarly, when the wheelchair 102 is traveling at a slower speed, the door operation controller 130 can select door operation criteria 120 that include a smaller area of interest. When the wheelchair 102 is traveling at a faster speed, the door operation controller 130 can select door operation criteria 120 that include a larger area of interest.

In some examples, the door operation criteria 120 can include different criteria for different sides of the door 110. For example, a virtual line crossing on a first side of the door 110 that is opposite from the direction of the swinging door may be positioned closer to the doorway 140 than a virtual line crossing on a second side of the door 110 that is in the direction of the swinging door. The door operation controller 130 can determine a particular side of the door 110 on which the wheelchair 102 is detected. The door operation controller 130 can select criteria for operating the door 110 based on the particular side of the door 110 on which the wheelchair 102 is detected.

The door operation criteria 120 can include criteria for various door operations. Door operations can include, for example, opening the door, shutting the door, maintaining the door open, and maintaining the door shut. The door operation controller 130 can determine a particular operation to be performed, and can select criteria based on the door operation to be performed.

An example door operation criterion 120 can include a virtual line crossing having a position that is automatically updated over time. For example, a virtual line crossing can have an initial position that is specified by a user, is located at a default distance from the door, or both. The door operation evaluator 114 can evaluate operation of the door, as described with reference to FIG. 1B, with the virtual line crossing at the initial position. Based on evaluating timeliness of the door operation, the door operation evaluator 114 can adjust the virtual line crossing to an updated position that is closer to the door or farther from the door. In some cases, the updated position can be a predetermined candidate position, e.g., a position that is a predetermined distance from the initial position. For example, based on the door opening too late, the door operation evaluator 114 can update the door operation criteria 120 to move the virtual line crossing to an updated position that is one foot farther from the door compared to the initial position. The door operation evaluator 114 can evaluate operation of the door independently from both sides of the door. This can result in a virtual line crossing on a first side of the door having a different position than a virtual line crossing on a second side of the door.

In some examples, the door operation criteria 120 can include criteria for different types of mobility assistance devices. For example, the door operation controller 130 can store door operation criteria 120 for operating the door 110 when the object classifier 106 detects a wheelchair 102, and different door operation criteria 120 for operating the door 110 when the object classifier 106 detects a walker, a cane, crutches, or any combination of these.

An example door operation criterion 120 can include determining that there are no obstacles in a swinging path of the door 110. For example, the camera 105 can analyze the camera images 104 to detect objects that may be in the swinging path of the door 110. If an object is in the swinging path of the door 110, the door operation controller 130 can determine that the camera images 104 do not satisfy door operation criteria 120. The door operation controller 130 can therefore determine to maintain the door 110 in the shut position until the object is no longer in the swinging path of the door 110.

An example door operation criterion 120 can specify that the door 110 is to open when the wheelchair 102 is within a threshold distance to the doorway 140. The door operation criteria 120 can include a threshold distance, e.g., of five feet, six feet, or seven feet from the doorway. The threshold distance can be based at least in part on characteristics of the door. For example, the threshold distance can be based on a size of the door and a type of door. As an example, a larger swinging door may have a larger threshold distance compared to a smaller swinging door. A swinging door may have a larger threshold distance than a sliding door or an overhead door.

The threshold distance can vary depending on speed of travel of the wheelchair 102. For example, the door operation controller 130 can select door operation criteria 120 that include a smaller threshold distance when the wheelchair 102 is traveling at a slower speed. The door operation controller 130 can select door operation criteria 120 that include a greater threshold distance when the wheelchair 102 is traveling at a faster speed.

In some examples, the camera 105 can determine the distance between the doorway 140 and the wheelchair 102 using a virtual line crossing 142 that is located at a particular distance from the doorway 140. In some examples, the camera 105 can determine the distance between the doorway 140 and the wheelchair 102 using video analytics. For example, the camera 105 can determine the distance between the doorway 140 and the wheelchair 102 using a size of the wheelchair 102 as depicted in the camera images. In some examples, the object tracker 111 can be trained to associate sizes of wheelchairs in the images 104 with distances between the wheelchair and the doorway 140.

In some examples, the camera 105 can determine the distance between the doorway 140 and the wheelchair 102 using additional sensor data 126. The additional sensor data 126 can include, for example, additional camera image data, LIDAR sensor data, RADAR sensor data, audio sensor data, or any combination of these. In some examples, the additional sensor data 126 can be generated by a sensor that is integrated with the camera 105. In some examples, the additional sensor data 126 can be generated by a sensor that is included in a separate device from the camera 105.

In an example, the camera 105 can include an integrated LIDAR sensor that encodes each pixel captured by the camera 105 with ranging data that indicates a distance from the camera 105. The camera can be positioned a set distance from the doorway 140. The camera 105 can therefore determine a distance between the doorway 140 and the wheelchair 102 using the measured distance of the wheelchair 102 from the camera 105 and the set distance between the camera 105 and the doorway 140.

In another example, the camera 105 can receive sensor data 126 including additional camera image data from a second camera that is positioned near the doorway 140. The second camera can be positioned in a set location in relation to the doorway 140. The camera 105 can therefore determine a distance between the doorway 140 and the wheelchair 102 by triangulating the position of the wheelchair 102 using the camera images 104 and the additional camera image data.

When the position of the wheelchair 102, the predicted trajectory 112, or both satisfy door operation criteria 120 for opening the door 110, the door operation controller can determine to open the door 110. In response to determining to open the door 110, the door operation controller 130 can transmit, to the door operator 160, a "door open" command 204. In response to receiving the "door open" command 204, the door operator 160 operates to move the door 110 to an open position.

The camera 105 can continue to collect images of the door 110 as the door 110 opens. In some examples, the camera 105 can use computer vision technology to determine that the door 110 is open. The camera 105 can determine if the door 110 is open, shut, or partially open, for example, using lighting levels at the door 110 opening. For example, the camera 105 can be calibrated to illumination levels that are typical for when the door 110 is closed and for when the door 110 is open.

In some examples, the camera 105 can determine that the door 110 is open based on communications from the door operator 160. For example, after opening the door 110, the door operator 160 can send a signal to the camera 105 indicating that the door 110 is open.

Figure 2B:
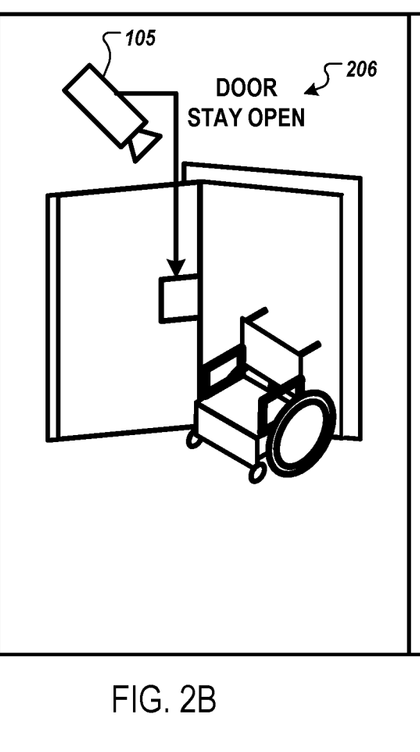

Referring to FIG. 2B, after the door 110 opens, the door operator 160 can maintain the door 110 in an open position for an amount of time. The amount of time can be, for example, a predetermined amount of time based on a countdown, an amount of time determined using a speed of travel of the wheelchair 102, a variable amount of time based on tracking movement of the wheelchair 102, or any combination of these.

In some examples, the door operator 160 can maintain the door in the open position for a predetermined amount of time. For example, the door operator 160 can include a timer or can receive input from a timer that performs a countdown. The countdown can count an amount of time, e.g., eight seconds, ten seconds, or twelve seconds. When the countdown ends, the door operator 160 can operate to shut the door 110. The timer can start the countdown, e.g., when the door operator 160 receives the "door open" command 204, when the wheelchair 102 crosses a virtual line crossing, or when the wheelchair 102 is predicted to cross a virtual line crossing.

In some examples, the door operator 160 can maintain the door in the open position for an amount of time determined by the door operation controller 130. For example, the predicted trajectory 112 can include a time that the wheelchair 102 is predicted to pass through the doorway 140. Using the predicted trajectory 112, the door operation controller 130 can determine an amount of time for the door 110 to remain open. The door operation controller 130 can transmit, to the door operator 160, a "door open" command 204 that causes the door 110 to open and remain open for the amount of time determined by the door operation controller 130. For example, when the object tracker 111 determines that the wheelchair 102 is traveling at faster speeds, the door operation controller 130 can transmit a "door open" command 204 that causes the door 110 to remain open for a shorter amount of time, e.g., six seconds. When the object tracker 111 determines that the wheelchair 102 is traveling at slower speeds, the door operation controller 130 can transmit a "door open" command 204 that causes the door 110 to remain open for a longer amount of time, e.g., ten seconds.

In some examples, the door operation controller 130 can determine an amount of time to maintain the door 110 in the open position based at least in part on a direction in which the door 110 swings. For example, the door operation controller 130 can determine to maintain the door 110 in the open position for a longer amount of time when the door 110 swings away from the direction of approach of the wheelchair 102, and for a shorter amount of time when the door 110 swing towards the direction of approach of the wheelchair 102.

In some examples, the door operation controller 130 can store data indicating the swinging direction of the door 110. For example, the swinging direction of the door 110 can be input to the camera 105 by a user. The user can input the swinging direction, e.g., through a user interface during a setup process of the system 100. In some examples, the camera 105 can learn the swinging direction of the door 110 over time. For example, the camera 105 can capture images of the door 110 opening and closing. The camera 105 can use computer vision technology to determine the swinging direction of the door 110. The camera 105 can also use computer vision technology to map a swinging path of the door in the field of view.

In some examples, the door operator 160 can maintain the door in the open position based on receiving a "stay open" command 206 from the door operation controller 130. In response to receiving the "stay open" command 206, the door operator 160 can apply a force to the door 110 that causes the door 110 to remain in the open position.

For example, after opening the door 110, the door operation controller 130 can determine to maintain the door in an open position based on tracking the position of the wheelchair 102 using the object tracker 111. In some examples, the door operation controller 130 can determine to maintain the door 110 in the open position until the wheelchair passes through the doorway 140, e.g., by crossing a doorsill 122 of the doorway 140.

In some examples, the door operation controller 130 can determine to maintain the door 110 in the open position until a certain amount of time after the wheelchair 102 passes through the doorway 140. For example, the object tracker 111 can determine a time when a back of the wheelchair 102 crosses the doorsill 122 of the doorway 140 or is predicted to cross the doorsill 122. The door operation controller 130 can determine to maintain the door open for an amount of time after the back of the wheelchair 102 crosses the doorsill 122. The door operation controller 130 can determine to maintain the door 110 in the open position for, e.g., three seconds, five seconds, or seven seconds after the wheelchair 102 crosses the doorsill 122 of the doorway 140.

In some examples, the door operation controller 130 can continue transmitting the "stay open" command 206 to the door operator 160 until the object tracker 111 determines that the wheelchair 102 has passed through the doorway 140. The object tracker 111 can determine an expected time until departure of the wheelchair 102 from a swing area of the door 110. The criterion for operating the door 110 can include a threshold time until the wheelchair 102 is expected to depart from the swing area of the door. The object tracker 111 can determine that the trajectory of the wheelchair 102 satisfies the criterion for operating the door 110 by determining that the expected time until departure of the wheelchair 102 from the swing area of the door is less than the threshold time. In response to determining that the trajectory of the wheelchair 102 satisfies the criterion for operating the door 110, the door operation controller 130 can transmit a command to shut the door 110.

In some examples, when the object tracker 111 determines that the wheelchair has passed through the doorway 140, the door operation controller 130 can cease transmitting the "stay open" command 206 to the door operator 160. When the door operation controller 130 ceases transmitting the "stay open" command 206 to the door operator 160, the door operator 160 can cease applying the force to maintain the door open. In response to the door operator 160 ceasing applying the force to maintain the door open, the door 110 can swing shut.

Figure 2C:
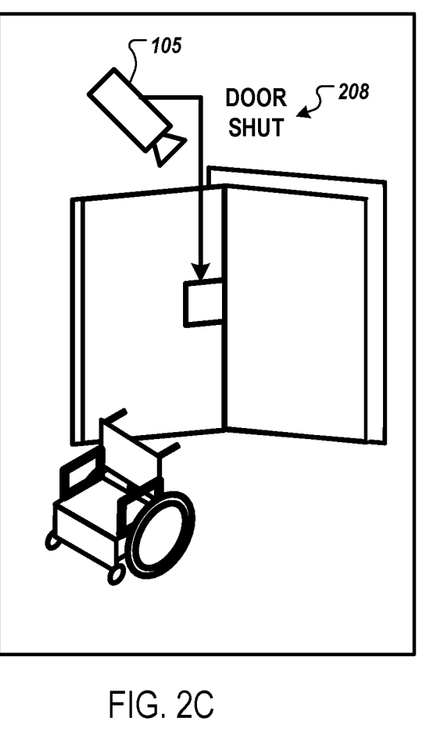

Referring to FIG. 2C, in some examples, instead of or in addition to ceasing transmitting the "stay open" command 206, the door operation controller 130 can transmit, to the door operator 160, a "shut" command 208. In some examples, the "shut" command 208 can cause the door operator 160 to cease applying the force to keep the door open. In some examples, the "shut" command 208 can cause the door operator 260 to apply a force to shut the door 110.

FIG. 1B shows a block diagram of an example system 150 for evaluating video-based door operation. The door operation evaluator 114 can analyze camera images 154 captured by the camera 105 in order to evaluate door operation 118. The door operation evaluator 114 can then update door operation criteria 116 based on evaluating the door operation. The door operation evaluator 114 can provide the updated door operation criteria 116 to the door operation controller 130.

In some examples, the door operation evaluator 114 can evaluate each instance of door operation by the door operation controller 130. For example, each time the door operator 160 causes the door 110 to open, the door operation evaluator 114 can obtain camera images 154 captured by the camera 105 during the operation of the door 110. In some examples, the camera images 154 can include a number of images that were captured by the camera 105 before and after operation of the door 110. For example, the camera images 154 can include images captured between a time that is two seconds prior to the door 110 opening and a time that is two seconds after the door 110 closing.

In some examples, the door operation evaluator 114 can evaluate a sample of door operations by the door operation controller 130. For example, the door operation evaluator 114 can evaluate one door operation out of every ten operations, every twenty operations, or every thirty operations. In some examples, the door operation evaluator 114 can evaluate a number of door operations that occur within a time period. For example, the door operation evaluator 114 can evaluate one door operation out of each hour in which the door 110 operates.

In some examples, the door operation evaluator 114 includes a machine learning model such as a neural network model. The door operation evaluator 114 can be trained to identify successful door operations. In some examples, the door operation evaluator 114 can be trained by providing the door operation evaluator 114 with video images depicting successful door operations.

A successful door operation can include, for example, a door operation in which the door 110 opens to allow a mobility assistance device to cross through the doorway 140 without slowing down. In some examples, a successful door operation can include a door operation in which the door 110 shuts shortly after the mobility assistance device crosses through the doorway 140, without interfering with the movement of the mobility assistance device.

In some examples, the door operation evaluator 114 can evaluate door operations 118 by comparing the camera images 154 with door operation performance criteria. The door operation evaluator 114 can determine, using the camera images 154, whether operation of the door satisfied the performance criteria. Performance criteria can include criteria for determining whether an appropriate door operation is performed, e.g., a door operation of opening, shutting, maintaining open, or maintaining shut. A door operation that does not satisfy performance criteria due to inappropriate door operation can be, for example, a failure of the door to open when a mobility assistance device approaches the doorway, a failure of the door to remain open while the mobility assistance device passes through the doorway, or a failure of the door to shut after the mobility assistance device passes through the doorway.

Performance criteria can include criteria for determining whether the door operation is timely or not timely. A door operation that is timely can be a door operation that permits passage through the doorway without causing a disruption to movement of the mobility assistance device. A door operation that is not timely can be a door operation that is too slow or too fast, such that movement of the mobility assistance device is disrupted or impeded. A door operation that does not satisfy performance criteria due to being untimely can be, for example, opening a door too slowly, such that the mobility assistance device slows or stops before being able to proceed through the doorway. A door operation that does not satisfy performance criteria due to being untimely can be, for example, a door shutting too quickly, such that the door impacts the mobility assistance device as the mobility assistance device passes through the doorway.

The door operation performance criteria can include, for example, a maximum change in velocity of the wheelchair 102 as the wheelchair 102 passes through the doorway 140. For example, the door operation evaluator 114 can determine, using the camera images 154, a change in velocity of the wheelchair 102. The door operation evaluator 114 can determine that the change in velocity of the wheelchair 102 does not satisfy a threshold change in velocity. Based on determining that the change in velocity of the wheelchair 102 does not satisfy the threshold change in velocity, the door operation evaluator 114 can determine that the operation of the door 110 does not satisfy performance criteria. In an example, the door operation performance criteria can include a maximum change in velocity of the wheelchair 102 of ten percent as the wheelchair 102 passes through the doorway 140. A change in velocity greater than the maximum change can indicate that the door 110 opened too late, causing the wheelchair 102 to slow down. Based on the change in velocity of the wheelchair 102 being greater than the maximum change in velocity, the door operation evaluator 114 can generate updated door operation criteria 116, e.g., that causes the door 110 to open earlier.

In some examples, the door operation performance criteria can include a threshold distance between the door 110 and the wheelchair 102 as the door 110 swings open and shut. For example, the door operation evaluator 114 can determine, using the camera images 154, a smallest distance between the wheelchair 102 and the door 110. The door operation evaluator 114 can determine that the smallest distance between the wheelchair 102 and the door 110 does not satisfy a threshold distance. Based on determining that the smallest distance between the wheelchair 102 and the door 110 does not satisfy the threshold distance, the door operation evaluator 114 can determine that the operation of the door 110 does not satisfy performance criteria.

In an example, the door operation performance criteria can include a minimum threshold distance of twelve inches between the door 110 and the wheelchair 102 as the door 110 swings shut. As the wheelchair 102 passes through the doorway 110, a smallest distance between the wheelchair 102 and the door 110 may be ten inches. The smallest distance between the wheelchair 102 and the door 110 of ten inches is less than the minimum threshold distance of twelve inches. This can indicate that the door 110 swung shut too early. Based on the smallest distance being less than the minimum threshold distance, the door operation evaluator 114 can generate updated door operation criteria 116 that cause the door 110 to shut later in subsequent instances of object detection.

In some examples, the door operation performance criteria can include a maximum and minimum amount of time that the door 110 is in the open position. For example, the door operation evaluator 114 can determine, using the camera images 154, a duration of time that the door 110 is open. The door operation evaluator 114 can determine that the duration of time that the door 110 is open does not satisfy a threshold duration of time. Based on determining that the amount of time that the door 110 is open does not satisfy the threshold duration of time, the door operation evaluator 114 can determine that the operation of the door 110 does not satisfy performance criteria.

The door operation performance criteria can include a minimum threshold time, e.g., of one second, and a maximum threshold time, e.g., of three seconds, that the door 110 is in the open position before the wheelchair 102 crosses the doorsill 122. In an example scenario, a time that the door 110 is open before the wheelchair 102 crosses the doorsill 122 is 0.75 seconds. The time that the door 110 is open of 0.75 seconds before the wheelchair 102 crosses the doorsill 122 is less than the minimum threshold time of one second. Thus, the door operation evaluator 114 can determine that the door 110 opened too late. In response to determining that the time that the door is open is less than the minimum threshold time, the door operation evaluator 114 can generate updated door operation criteria 116 that cause the door 110 to open earlier.

In another example scenario, a time that the door is open before the wheelchair 102 crosses the doorsill 122 is four seconds before the wheelchair 102 crosses the doorsill 122. The time that the door 110 is open of four seconds before the wheelchair 102 crosses the doorsill 122 is greater than the maximum threshold time of three seconds. Thus, the door operation evaluator 114 can determine that the door 110 opened too early. In response to determining that the time that the door is open is greater than the maximum threshold time, the door operation evaluator 114 can generate updated door operation criteria 116 that cause the door 110 to open later.

In some examples, the door operation performance criteria can include a maximum threshold time and minimum threshold time that the door 110 is in the open position after the wheelchair 102 crosses the doorsill 122, after the wheelchair 102 exits the swinging area of the door 110, or both. For example, the door operation performance criteria can include a minimum threshold time of two seconds, and a maximum threshold time of four seconds, that the door 110 is in the open position after the wheelchair 102 crosses the doorsill 122. A time that the door 110 is open that is less than the minimum can indicate that the door 110 closed too quickly. A time that the door 110 is open that is greater than the maximum can indicate that the door 110 closed too late. In response to determining that the time that the door 110 is open is less than the minimum threshold time, the door operation evaluator 114 can generate updated door operation criteria 116 that cause the door 110 to shut later. In response to determining that the time that the door 110 is open is greater than the maximum threshold time, the door operation evaluator 114 can generate updated door operation criteria 116 that cause the door 110 to shut earlier.

The door operation evaluator 114 can also monitor operation of the door for events such as the door 110 contacting obstacles. For example, the door operation evaluator 114 can analyze camera images 154 to identify instances when the door 110 swings open and contacts an object that is within the swinging area of the door 110. Based on the door 110 contacting the object, the door operation evaluator 114 can generate updated door operation criteria 116 that expand an area of interest near the door 110 within which detected objects inhibit door operation. In some examples, the door operation evaluator 114 can generate updated door operation criteria 116 that change a position of a virtual line crossing near the door 110. When the object classifier 106 detects an object across the virtual line crossing, the door 110 can be prohibited from operation.

In some implementations, the system 150 may undergo a calibration phase upon installation. The calibration phase can include monitoring door operations over a period of time. The camera 105 can use computer vision technology to detect patterns and trends in operation of the door. For example, the camera 105 can analyze camera images 154 to determine a swinging direction of the door, a swinging path of the door 110, or any combination of these. The camera 105 can also determine an average amount of time for opening the door to a fully open position, an average amount of time for closing the door from the fully open position, an average amount of time between transmission of the open/shut command 124 to the door operator 160 and the door 110 beginning to open, or any combination of these. In some examples, the camera 105 can perform recalibration periodically after installation and/or on-demand when requested by a user.

Although primarily described in this disclosure as a swinging door, the disclosed systems can be used for operation of other door types, e.g., a sliding door, overhead door, or revolving door. For example, a camera can track movement of a mobility assistance device into a chamber of a revolving door. Based on detecting the mobility assistance device in the chamber, the camera can send a command to a door operator to cause the revolving door to rotate. The camera can track movement of the mobility assistance device exiting the revolving door, and send commands that cause the revolving door to pause until the person with the mobility assistance devices has safely exited the chamber.

Although primarily described in this disclosure as a wheelchair, the disclosed systems and techniques can be used for door operation based on object detection of other mobility assistance devices or other objects. For example, the disclosed techniques can be used for door operation based on object detection of canes, walkers, stretchers, strollers, or any of these. The door operation controller 130 can store multiple variations of door operation criteria 120 for one or more different object types. For example, the door operation controller 130 can store door operation criteria 120 for wheelchairs, and different door operation criteria 120 for walkers.

In an example, the object classifier 106 may detect a walker in the camera images 104. Based on detecting a walker in the camera images 104, the object tracker 111 can generate a predicted trajectory 108 of the walker. The door operation controller can then select door operation criteria 120 for a walker. The door operation criteria 120 can include, for example, a virtual line crossing positioned such that when the walker crosses the virtual line crossing, or is predicted to cross the virtual line crossing, the door operation controller 130 transmits the door open/shut command 124 to the door operator 160 to cause the door 110 to open. The virtual line crossing for a walker can be located at a position that is different from the virtual line crossing for a wheelchair.

Figure 3:
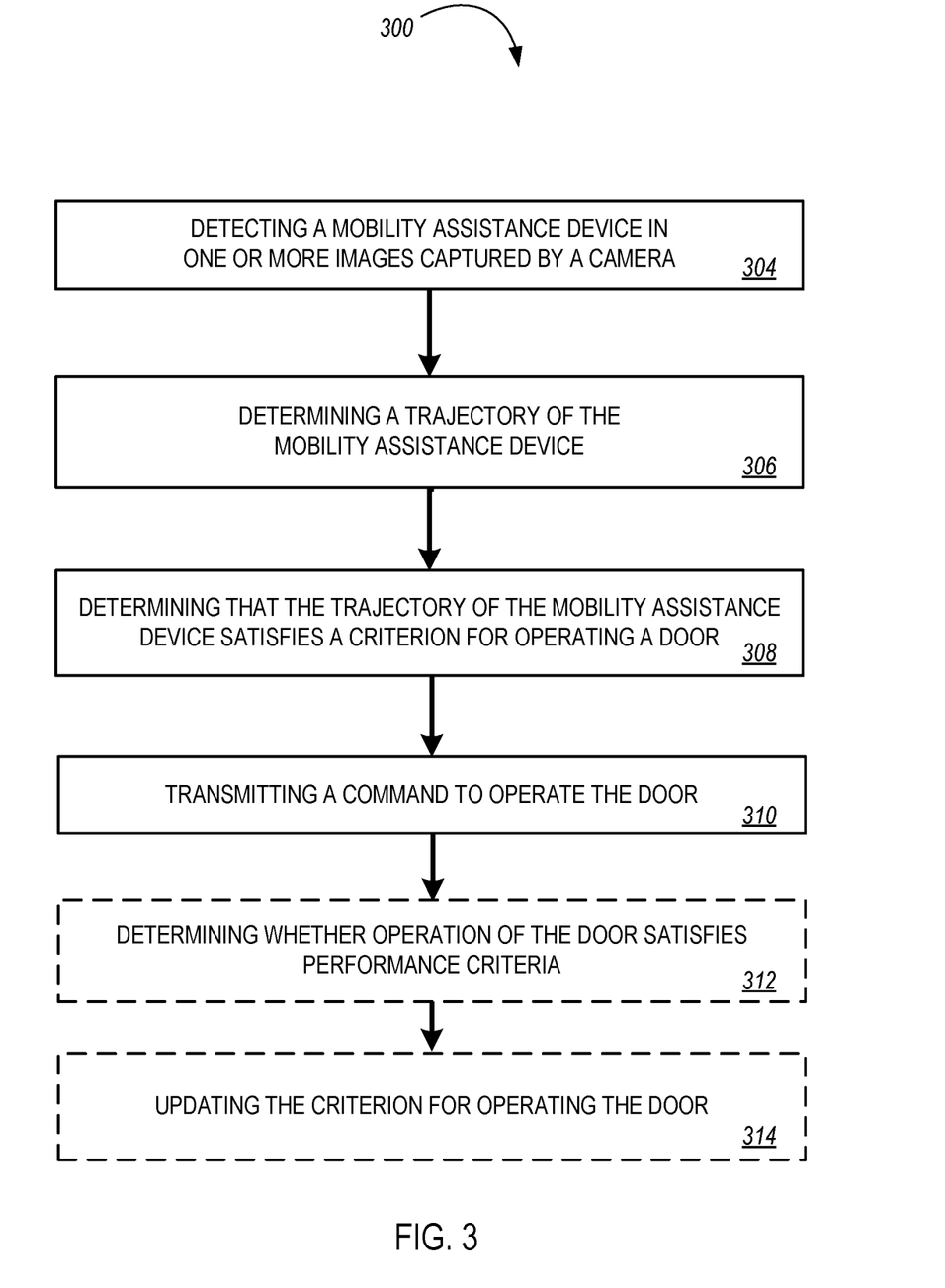
FIG. 3 is a flowchart of an example process for video-based door operation.

FIG. 3 is a flowchart of an example process 300 for video-based door operation using object tracking. The process 300 can be performed by one or more computer systems, for example, the camera 105.

Briefly, the process 300 includes detecting a mobility assistance device in one or more images captured by a camera (304), determining, using the one or more images captured by the camera, a trajectory of the mobility assistance device (306), determining that the trajectory of the mobility assistance device satisfies a criterion for operating a door (308), and in response to determining that the trajectory of the mobility assistance device satisfies the criterion for operating the door, transmitting, to a door operator, a command to operate the door (310). The process 300 optionally includes determining whether operation of the door satisfies performance criteria using one or more second images (312), and in response to determining that the operation of the door did not satisfy performance criteria, updating the criterion for operating the door (314).

The process 300 includes detecting, in the one or more images captured by a camera, a mobility assistance device (304). For example, the camera 105 can obtain camera images 104 representing a scene of a property that includes a doorway 140. The object classifier 106 can detect, in the camera images 104, a wheelchair 102.

The process 300 includes determining, using the one or more images captured by the camera, a trajectory of the mobility assistance device (306). For example, the object tracker 111 can generate a predicted trajectory 112 of the wheelchair 102.

The process 300 includes determining that the trajectory of the mobility assistance device satisfies a criterion for operating a door (308). For example, the door operation controller 130 can determine that the predicted trajectory 112 of the wheelchair 102 satisfies door operation criteria 120.

The process 300 includes transmitting, to a door operator, a command to operate the door (310). For example, based on determining that the predicted trajectory 112 of the wheelchair 102 satisfies the door operation criteria 120, the door operation controller 130 can transmit a door open/shut command 124 to the door operator 160. The door open/shut command 124 can cause the door operator 160 to open or shut the door 110.

The process 300 optionally includes determining whether operation of the door satisfies performance criteria using one or more second images (312). For example, the door operation evaluator 114 can evaluate camera images 154 to determine whether operation of the door 110 satisfies performance criteria. The camera images 154 can include images captured during operation of the door 110, e.g., images captured while the door opens and shuts. The camera images 154 can include images captured by the camera 105 after transmitting the command to operate the door.

The process 300 optionally includes, in response to determining that the operation of the door did not satisfy performance criteria, updating the criterion for operating the door (314). For example, based on determining that the operation of the door 110 was too late or too early, the door operation evaluator 114 can generate updated door operation criteria 116.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   detecting, in one or more images captured by a camera, a mobility assistance device;
   in response to detecting the mobility assistance device, determining, using the one or more images captured by the camera, a trajectory of the mobility assistance device;
   determining that the trajectory of the mobility assistance device satisfies a criterion for operating a door;
   in response to determining that the trajectory of the mobility assistance device satisfies the criterion for operating the door, transmitting, to a door operator, a first-command to operate the door;
   determining whether the operation of the door satisfies performance criteria using one or more second images, the determining comprising:
      determining, using the one or more second images, a smallest distance between the mobility assistance device and the door;
      determining that the smallest distance between the mobility assistance device and the door does not satisfy a threshold distance; and
      in response to determining that the smallest distance between the mobility assistance device and the door does not satisfy a threshold distance, determining that the operation of the door does not satisfy performance criteria; and
   in response to determining that the operation of the door does not satisfy the performance criteria, updating the criterion for operating the door.

2. The method of claim 1, wherein the one or more second images comprise images captured by the camera after transmitting the command to operate the door.

3. The method of claim 1, wherein determining whether the operation of the door satisfies performance criteria using the one or more second images comprises:
   determining, using the one or more second images, a change in velocity of the mobility assistance device;
   determining that the change in velocity of the mobility assistance device does not satisfy a threshold change in velocity; and
   in response to determining that the change in velocity of the mobility assistance device does not satisfy the threshold change in velocity, determining that the operation of the door does not satisfy performance criteria.

4. The method of claim 1, wherein determining whether the operation of the door satisfies performance criteria using one or more second images comprises:
   determining, using the one or more second images, an amount of time that the door is open;
   determining that the amount of time that the door is open does not satisfy a threshold duration of time; and
   in response to determining that the amount of time that the door is open does not satisfy a threshold duration of time, determining that the operation of the door does not satisfy performance criteria.

5. The method of claim 1, wherein determining the trajectory of the mobility assistance device comprises determining an expected time until arrival of the mobility assistance device within a threshold distance from a doorway of the door.

6. The method of claim 5, wherein:
the criterion comprises an expected time threshold; and
determining that the trajectory of the mobility assistance device satisfies the criterion for operating the door comprises:
determining that the expected time until arrival of the mobility assistance device within the threshold distance from the doorway of the door satisfies the expected time threshold.

7. The method of claim 5, wherein determining the expected time until arrival of the mobility assistance device within the threshold distance from the doorway of the door comprises:
determining, using the one or more images, a direction of travel of the mobility assistance device; and
determining, using the one or more images, a speed of the mobility assistance device.

8. The method of claim 1, wherein determining the trajectory of the mobility assistance device comprises determining an expected time until departure of the mobility assistance device from a swing area of the door.

9. The method of claim 8, wherein determining that the trajectory of the mobility assistance device satisfies the criterion for operating the door comprises:
determining that the expected time until departure of the mobility assistance device from the swing area of the door satisfies a threshold expected time.

10. The method of claim 1, wherein determining that the trajectory of the mobility assistance device satisfies the criterion for operating the door comprises:
determining, using the one or more images, that the mobility assistance device is predicted to cross a virtual line crossing; or
determining, using the one or more images, that the mobility assistance device is predicted to enter an area of interest.

11. The method of claim 1, comprising:
maintaining criteria for a plurality of operations of the door;
determining, using the one or more images, a particular operation of the plurality of operations to be performed; and
selecting, from the maintained criteria, the criterion for performing the particular operation of the door.

12. The method of claim 1, comprising:
maintaining, for each of a plurality of characteristics of mobility assistance devices, respective criteria for operating the door, at least some criteria for the plurality of characteristics of mobility assistance devices being different than others of the maintained criteria;
determining, using the one or more images, a characteristic of the mobility assistance device; and
selecting, from the different maintained criteria, a criterion for operating the door using the characteristic of the mobility assistance device.

13. The method of claim 1, comprising:
maintaining, for each of multiple sides of the door, respective criteria for operating the door;
determining, using the one or more images, a particular side of the door on which the mobility assistance device is detected; and
selecting, from the maintained criteria, the criterion for operating the door using the particular side of the door on which the mobility assistance device is detected.

14. The method of claim 1, wherein the one or more images depict a scene of a property including a doorway.

15. The method of claim 1, wherein detecting the mobility assistance device comprises detecting the mobility assistance device using an object classifier of the camera.

16. The method of claim 1, wherein the command to operate the door comprises one of:
a command to open the door;
a command to maintain the door in an open position;
a command to shut the door; or
a command to maintain the door in a shut position.

17. A system comprising one or more computers and one or more computer storage media storing instructions that are operable, when executed by the one or more computers, to cause the one or more computers to perform operations comprising:
detecting, in one or more images captured by a camera, a mobility assistance device;
in response to detecting the mobility assistance device, determining, using the one or more images captured by the camera, a trajectory of the mobility assistance device;
determining that the trajectory of the mobility assistance device satisfies a criterion for operating a door;
in response to determining that the trajectory of the mobility assistance device satisfies the criterion for operating the door, transmitting, to a door operator, a command to operate the door;
determining whether the operation of the door satisfies performance criteria using one or more second images, the determining comprising:
determining, using the one or more second images, a smallest distance between the mobility assistance device and the door;
determining that the smallest distance between the mobility assistance device and the door does not satisfy a threshold distance; and
in response to determining that the smallest distance between the mobility assistance device and the door does not satisfy a threshold distance, determining that the operation of the door does not satisfy performance criteria; and
in response to determining that the operation of the door does not satisfy the performance criteria, updating the criterion for operating the door.

18. A non-transitory computer-readable medium storing software comprising instructions executable by one or more computers which, upon such execution, cause the one or more computers to perform operations comprising:
detecting, in one or more images captured by a camera, a mobility assistance device;
in response to detecting the mobility assistance device, determining, using the one or more images captured by the camera, a trajectory of the mobility assistance device;
determining that the trajectory of the mobility assistance device satisfies a criterion for operating a door;
in response to determining that the trajectory of the mobility assistance device satisfies the criterion for operating the door, transmitting, to a door operator, a command to operate the door;
determining whether the operation of the door satisfies performance criteria using one or more second images, the determining comprising:
determining, using the one or more second images, a smallest distance between the mobility assistance device and the door;

determining that the smallest distance between the mobility assistance device and the door does not satisfy a threshold distance; and in response to determining that the smallest distance between the mobility assistance device and the door does not satisfy a threshold distance, determining that the operation of the door does not satisfy performance criteria; and in response to determining that the operation of the door does not satisfy the performance criteria, updating the criterion for operating the door.

19. The method of claim 12, wherein the mobility assistance devices have a plurality of different types, the method comprising:

maintaining, for each of a plurality of characteristics of the plurality of different types of mobility assistance devices, respective criteria for operating the door, at least some criteria for different ones of the different types of mobility assistance devices having a different criterion;

determining, using the one or more images, a characteristic of the mobility assistance device; and selecting, from the different maintained criteria, the criterion for operating the door using the characteristic of the mobility assistance device that is a different criterion than would be selected for a second, different type of second mobility assistance device that does not have the characteristic of the mobility assistance device.

20. The system of claim 17, wherein determining whether the operation of the door satisfies performance criteria using the one or more second images comprises:

determining, using the one or more second images, a change in velocity of the mobility assistance device;

determining that the change in velocity of the mobility assistance device does not satisfy a threshold change in velocity; and in response to determining that the change in velocity of the mobility assistance device does not satisfy the threshold change in velocity, determining that the operation of the door does not satisfy performance criteria.

* * * * *

UNITED STATES PATENT AND TRADEMARK OFFICE
CERTIFICATE OF CORRECTION

PATENT NO. : 12,380,750 B2  
APPLICATION NO. : 17/833021  
DATED : August 5, 2025  
INVENTOR(S) : Kelly Kai Ming Wong

Page 1 of 1

It is certified that error appears in the above-identified patent and that said Letters Patent is hereby corrected as shown below:

In the Claims

Column 18, Line 18, Claim 1, please delete "first-command" and insert therefor -- command --

Signed and Sealed this  
Sixteenth Day of September, 2025

Coke Morgan Stewart  
*Acting Director of the United States Patent and Trademark Office*